(12) United States Patent
Pepin et al.

(10) Patent No.: US 7,908,582 B2
(45) Date of Patent: Mar. 15, 2011

(54) SYSTEM AND METHOD TO FACILITATE DESIGN-TIME COMPONENT DISCOVERY

(75) Inventors: Brian K. Pepin, Seattle, WA (US); Shawn P. Burke, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 1131 days.

(21) Appl. No.: 11/608,453

(22) Filed: Dec. 8, 2006

(65) Prior Publication Data

US 2007/0083848 A1    Apr. 12, 2007

Related U.S. Application Data

(63) Continuation of application No. 09/812,207, filed on Mar. 19, 2001, now Pat. No. 7,150,001.

(51) Int. Cl.
*G06F 9/44* (2006.01)
*G06F 9/45* (2006.01)
*G06F 11/00* (2006.01)

(52) U.S. Cl. ........ 717/100; 717/107; 717/110; 717/125; 717/154; 714/37; 719/328

(58) Field of Classification Search .................. None
See application file for complete search history.

(56) References Cited

U.S. PATENT DOCUMENTS

| | | | |
|---|---|---|---|
| 5,195,178 A | 3/1993 | Krieger et al. | |
| 5,835,910 A | 11/1998 | Kavanagh et al. | |
| 5,950,001 A * | 9/1999 | Hamilton et al. | 717/107 |
| 6,012,067 A | 1/2000 | Sarkar | |
| 6,018,627 A * | 1/2000 | Iyengar et al. | 717/103 |
| 6,026,237 A | 2/2000 | Berry et al. | |
| 6,059,838 A * | 5/2000 | Fraley et al. | 717/108 |
| 6,167,563 A | 12/2000 | Fontana et al. | |
| 6,349,404 B1 | 2/2002 | Moore et al. | |
| 6,374,252 B1 | 4/2002 | Althoff et al. | |
| 6,377,987 B1 | 4/2002 | Kracht | |
| 6,381,734 B1 * | 4/2002 | Golde et al. | 717/165 |
| 6,421,681 B1 | 7/2002 | Gartner et al. | |
| 6,453,356 B1 | 9/2002 | Sheard et al. | |
| 6,499,035 B1 | 12/2002 | Sobeski | |
| 6,505,342 B1 | 1/2003 | Hartmann et al. | |
| 6,507,833 B1 * | 1/2003 | Hichwa et al. | 707/702 |
| 6,631,512 B1 * | 10/2003 | Onyeabor | 717/100 |
| 6,704,743 B1 | 3/2004 | Martin | |
| 6,714,928 B1 * | 3/2004 | Calow | 1/1 |
| 6,718,533 B1 | 4/2004 | Schneider | |

(Continued)

OTHER PUBLICATIONS

Kurt, et al. "A Component Based Approach to Building Formals Analysis Tools" (2001) IEEE, pp. 167-176.

(Continued)

*Primary Examiner* — Tuan Q Dam
*Assistant Examiner* — Zheng Wei
(74) *Attorney, Agent, or Firm* — Workman Nydegger (57) ABSTRACT

A system and method for discovering the design time attributes of a component are provided. The invention includes a type descriptor that can access metadata associated with a component and report the metadata to a development tool. The invention further includes a custom type descriptor interface that can be implemented on a component in order to dynamically provide information regarding the component to the type descriptor. The invention further includes a type descriptor filter service interface that can be implemented by the development tool to facilitate filtering of design time information regarding components in order to simulate a run time environment. The invention further comprises methodologies and tools for facilitating application development.

12 Claims, 9 Drawing Sheets

U.S. PATENT DOCUMENTS

| | | | |
|---|---|---|---|
| 6,718,535 B1 | 4/2004 | Underwood | |
| 6,738,964 B1 * | 5/2004 | Zink et al. | 717/105 |
| 6,742,175 B1 | 5/2004 | Brassard | |
| 6,836,878 B1 * | 12/2004 | Cuomo et al. | 717/100 |
| 6,948,150 B1 | 9/2005 | Pepin | |
| 7,150,000 B1 * | 12/2006 | Feldman | 717/103 |
| 2001/0018689 A1 | 8/2001 | Spence et al. | |
| 2002/0083415 A1 * | 6/2002 | Jazdzewski | 717/111 |
| 2003/0163585 A1 | 8/2003 | Elderon et al. | |

OTHER PUBLICATIONS

Lorenz, et al. "Design-Time Assembly of Runtime Components" (2003) pp. 1-10.

Rosa, et al. "Component Configurer: A Design Pattern to Component-Based Configuration" (1997) pp. 1-14.

Natarajan, et al. "Merging Component Models and Architectual Styles" (1998) pp. 109-111.

* cited by examiner

SYSTEM AND METHOD TO FACILITATE DESIGN-TIME COMPONENT DISCOVERY

CROSS REFERENCE TO RELATED APPLICATIONS

This application is a continuation of U.S. application Ser. No. 09/812,207, filed Mar. 19, 2001, entitled SYSTEM AND METHOD TO FACILITATE DESIGN-TIME COMPONENT DISCOVERY, which is hereby incorporated by reference as if fully set forth herein.

TECHNICAL FIELD

The present invention relates generally to the design time implementation of components. More particularly, the invention relates to component model discovery services for design time.

BACKGROUND OF THE INVENTION

In an object-oriented software component environment, developers utilize development tools at design time to create user applications. Software components may be written by various suppliers in a variety of source languages. The user applications are then implemented at run time.

Conventionally, during design time, a development tool typically reports a static set of information (e.g., properties) about a component to a developer. Thus, conventionally, component information is static and provided by the compiled component to the development tool when the development tool is constructed (e.g., compiled). Changes in the component are not reflected in the development tool dynamically; generally only the information known about the component at the time the development tool was constructed (e.g., compiled) is available to the developer. The development tool is thus unable to effectively utilize changes in the component unless and until it is reconstructed (e.g., recompiled).

In a design time environment, in order to use a component, a development tool typically creates an instance of the component. The development tool generally utilizes an engine to report information (e.g., properties) associated with the component that is reported to the developer. Thus, the developer can manipulate the component utilizing the information (e.g., properties) associated with the component.

Conventionally, development tools are able to obtain properties from the component that provide limited information to the developer—any special behavior had to be provided for by the development tool (e.g., Visual Basic or Visual C++). Thus, at design time, in order to simulate the run time environment, the development tool provides additional properties to a component through extender properties that the development tool provides on the component's behalf. The development tool merges these extender properties into the flow of properties, which introduces additional complexity, and thus additional costs into the development of the development tool. Similarly, certain properties should not be exposed at design time; these properties should only be exposed at run time. The development tool and/or the component must know the particular properties that should not actually change control at design time. The development tool and/or the component remove these particular properties from the flow of properties.

For example, a component that includes a database query should not execute the database query at design time. Instead, at design time, the developer may desire to have the query stored until run time without having the component execute the database query. Presently, the component and/or the development tool implements the design time implementation of blocking the database query execution at design time.

Thus, conventionally, implementation of the design time environment has been an awkward cooperative effort between the component and the development tool. From the component side, the component inquired as to whether it is in design mode and then took no action based upon the data it received during design time. Alternatively, the development tool could merge in additional properties or pull properties off of the set of properties that are exposed in order to implement the design time environment. However, the development tool maintained a static set of information about a component. In order to update or modify information about a component, the development tool would need to be recompiled and reissued as a new release of the development tool.

Thus, at present development tools and/or components must implement a method and system for the design time context of components. This design time implementation is compiled into the development tool and/or components is inflexible and is very complex.

SUMMARY

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

"Metadata" is binary information describing a component that can be stored within the component's code or in memory. Generally, every type, member and attribute defined and referenced in a component is described within its metadata. "Type" refers to information such as the component's name, visibility, base class and interfaces implemented. "Member" refers to methods, fields, properties, events and nested types. "Attribute" refers to additional descriptive elements that modify types and members. Thus, through metadata a component can self describe its interaction with other components. A "class" is a defined data type which specifies the type of class members that define the representation of a variable of the type (e.g., an object of the class), the set of operations (e.g., functions) that manipulate such objects, and the access users have to these members. The term "site" refers to a communication mechanism between an instance of a component and a container that is holding that object, such as a designer. Components can use the "site" to discover things about their container, and containers can use the site to identify components that they are hosting.

The present invention relates to a system and method for an application development system in which a type descriptor is adapted to access metadata associated with an instance of a component thus allowing the type descriptor to dynamically provide information (e.g., types, members and attributes) related to the instance of the component to a developer to facilitate application development. The type descriptor is part of a component model that defines a set of information (e.g., types, members and attributes) that may be attached to a class and its members to describe the class' design time behavior. The component model provides a simple, consistent and extensible mechanism for defining a class including its design time behavior and attributes. The type descriptor retrieves information concerning an instance of a component (e.g., attributes such as properties and events) from metadata, stores the information and reports it to the developer.

Another aspect of the present invention provides for an optional interface called custom type descriptor to be implemented on the instance of a component. If this optional interface is not implemented, pure metadata regarding the instance of the component is provided to the type descriptor that is then reported to the development tool. However, if the custom type descriptor interface is implemented, the custom type descriptor interface is responsible for providing information, which can be pure metadata or manipulated information, to the type descriptor For components that implement the custom type descriptor interface, type descriptor, instead of examining the information concerning the component through metadata that has been compiled into the component, requests the component to provide information about itself through the component's custom type descriptor interface. The custom type descriptor interface is adapted to monitor information concerning the instance of the component, (e.g., attributes) and to manipulate the information before reporting the information to the type descriptor. This allows a component to dynamically alter information, such as attributes (e.g., properties and events), associated with the instance of the component. The information reported to the type descriptor by the custom type descriptor interface can be different than the metadata that was compiled into the component. The component can further define information about itself at design time and/or run time as opposed to compile time. Thus, a component can adaptively modify or revise information about itself depending on whether it is running at design time or run time. Furthermore, a component can adaptively modify or revise information about itself depending upon the environment in which it will be run (e.g., access to a WAN, LAN or the Internet).

At design time, a component may add additional properties to another component (e.g., extender properties) in order to simulate the run time environment. Additionally, properties may be removed and, a property, when accessed, may execute code in a different component than where the property was defined (e.g., shadowed property). Thus the present invention provides for a component to adaptively respond to changes in its design time implementation.

Another aspect of the present invention provides for an optional interface called type descriptor filter service interface to be provided by the development tool. The existence of the type descriptor filter service interface is transparent to the developer. The type descriptor filter service interface can be implemented through a service on a container to which a component instance is sited.

At design time, a developer requests the development tool to report information (e.g., types, members and attributes) concerning an instance of a component. The development tool requests type descriptor to report information associated with the instance of the component. Type descriptor determines whether the instance of the component has a site (e.g., is owned by a container). If the instance of the component has a site, the type descriptor determines whether the site offers the type descriptor filter service interface for the instance of the component.

If the type descriptor filter service interface is provided, the type descriptor provides information (e.g., types, member and attributes) regarding the instance of the component. The information can be pure metadata or, if the custom type descriptor interface is implemented by the instance of the component, manipulated information. The type descriptor filter service interface can then manipulate the information received from type descriptor by: (1) allowing additional attributes to be added; (2) removing attributes; and/or (3) replacing attributes.

After the type descriptor filter service interface performs any manipulation, the information is provided to type descriptor. Type descriptor can store the information concerning the instance of the component and report the information to the development tool that reports the information to the developer. Thus, the filtering process is transparent to the developer since the developer views the manipulated information concerning the instance of the component. Furthermore, by allowing the design time functionality of the component to be implemented by a separate object (e.g., type descriptor filter service or a designer) independent of the component, the component can be significantly smaller in size resulting in memory savings at run time.

The present invention also provides methods for discovering design time information (e.g., types, members and attributes) concerning an instance of a component; discovering design time information of an instance of a component having a custom type interface; and, for discovering design time information of an instance of a component in a development tool provided with a type descriptor filter service interface.

To the accomplishment of the foregoing and related ends, certain illustrative aspects of the invention are described herein in connection with the following description and the annexed drawings. These aspects are indicative of but a few of the various ways in which the principles of the invention may be employed and the present invention is intended to include all such aspects and their equivalents. Other advantages and novel features of the invention may become apparent from the following detailed description of the invention when considered in conjunction with the drawings.

DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident to one skilled in the art that the present invention may be practiced without these specific details. In other instances, well-known structures and devices are shown in block diagram form in order to facilitate description of the present invention.

The term "component" refers to a computer-related entity, either hardware, a combination of hardware and software, software, or software in execution. For example, a component may be a process running on a processor, a processor, an object, an executable, a thread of execution, a program and a computer. By way of illustration, both an application running on a server and the server can be components.

Figure 1:
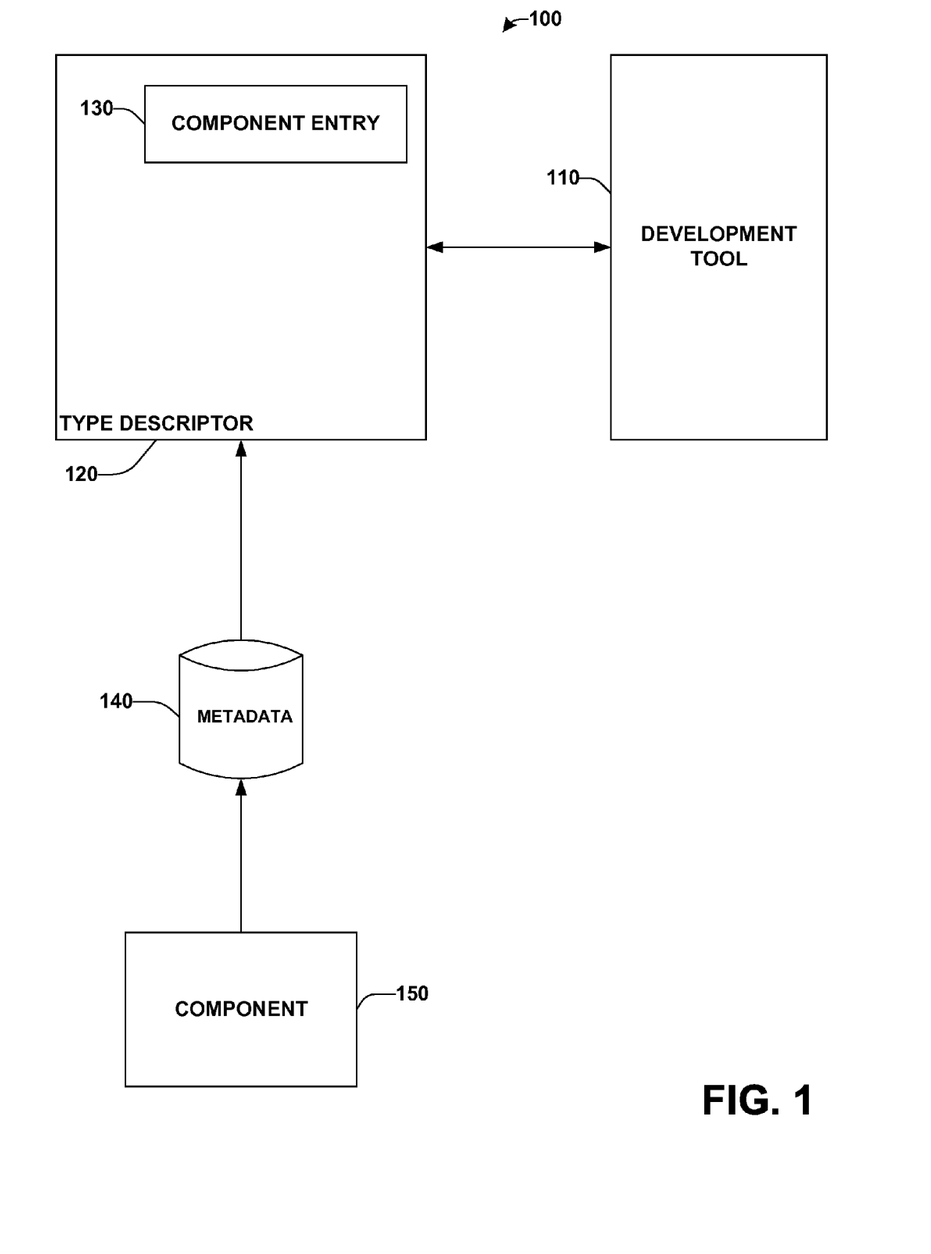
FIG. 1 is a schematic block diagram illustrating a system for implementing a design time component model discovery service in accordance with an aspect of the present invention.

Referring to FIG. 1, a system 100 for implementing a design time component model discovery service is illustrated. The system 100 includes a type descriptor 120 that stores a component entry 130 regarding an instance of a component 150. The type descriptor 120 is adapted to dynamically retrieve metadata 140 concerning the instance of the component 150.

In response to a request for information (e.g., attributes such as properties and events) concerning an instance of the component 150 from the developer, the development tool 110 requests the type descriptor 120 to provide information (e.g., attributes such as properties and events) associated with the instance of the component 150. The type descriptor 120 dynamically inspects the metadata 140 for the instance of the component 150 and provides information concerning the instance of the component 150 to the developer to facilitate application development.

Figure 2:
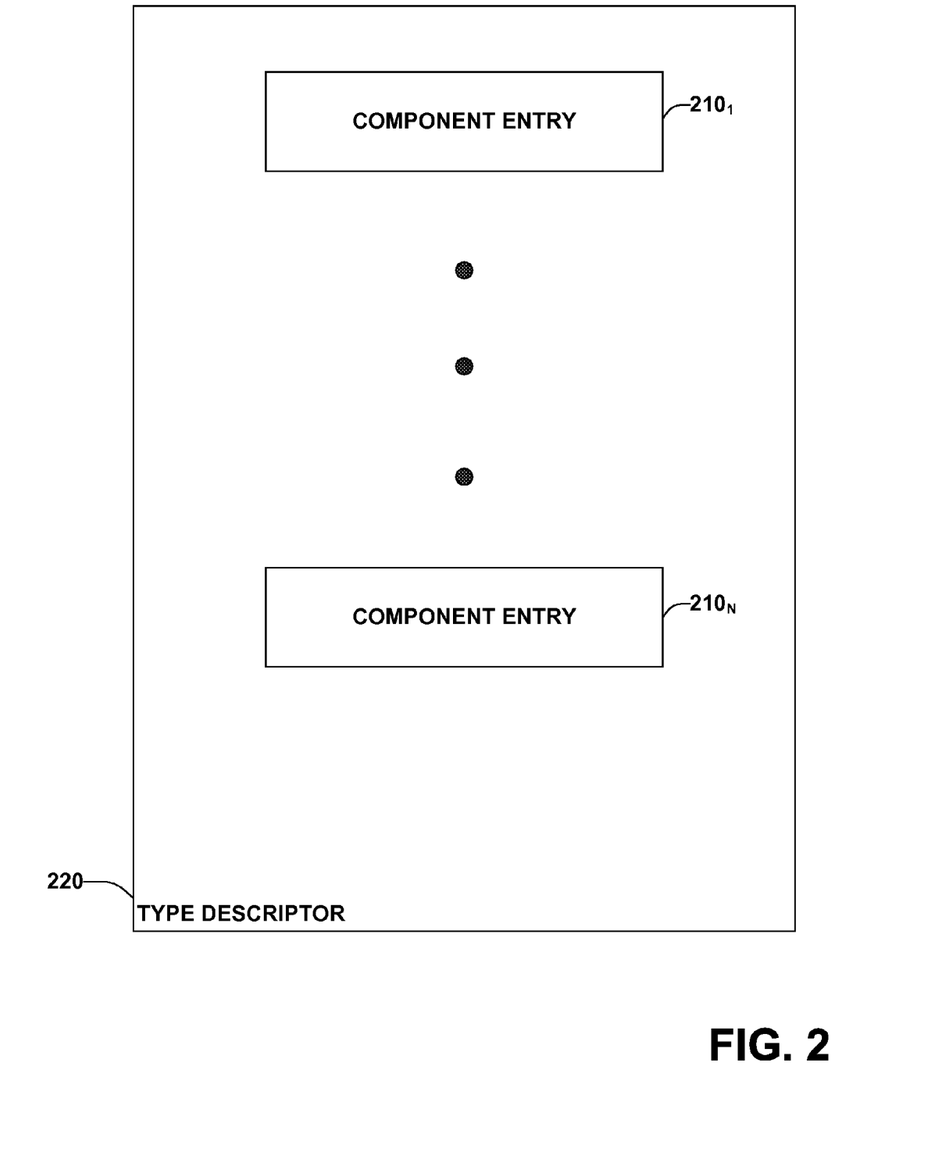
FIG. 2 is a block diagram depicting an exemplary data structure of data stored within a type descriptor.

Referring to FIG. 2, an exemplary type descriptor 220 data structure is illustrated. The type descriptor 220 includes component entry $210_1$ through an Nth component entry $210_N$, N being an integer. The component entries $210_1$ through $210_N$ can be referred to collectively as the component entries 210. The type descriptor 220 can provide a component entry 210 for each instance of a component active in the design time environment. It is to be appreciated the data structure of data within the type descriptor 220 can be stored in any suitable data structure including, but not limited to, databases, tables, records, arrays and lists.

Figure 3:
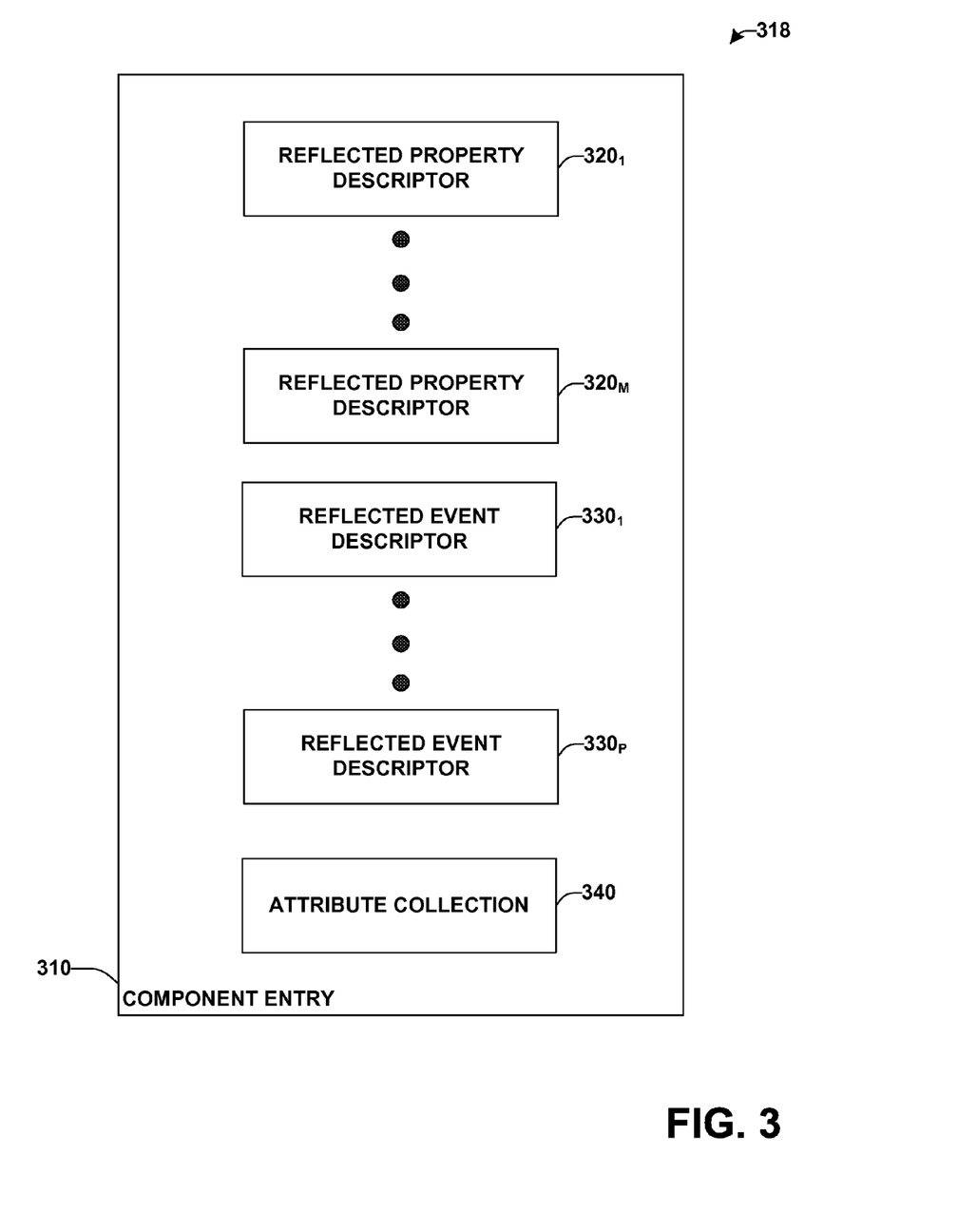
FIG. 3 is a block diagram depicting an exemplary data structure of data stored within a component entry.

FIG. 3 illustrates an exemplary component entry data structure 318. The component entry 310 includes reflected property descriptor $320_1$ through an Mth reflected property descriptor $320_M$, M being an integer. The reflected property descriptors $320_1$ through $320_M$ can be referred to collectively as the reflected property descriptors 320. Property descriptor is a class which provides a description of a property (e.g., its name, attributes, component class that the property is associated with, and the type of the property). A reflected property descriptor is a reflection of a property descriptor. The component entry 310 further includes reflected event descriptor $330_1$ through a Pth reflected event descriptor $330_P$, P being an integer. The reflected event descriptors $330_1$ through reflected event descriptor $330_P$ can be referred to collectively as the reflected event descriptors 330. Event descriptor is a class which provides a description of an event (e.g., its name, attributes, the component that the event is bound to, the event delegate, the type of the delegate, and whether the delegate is multicast). A reflected event descriptor is a reflection of an event descriptor. The component entry 310 can further include an attribute collection 340. It is to be appreciated that the data structure of data within the component entry can be stored within any suitable data structure including, but not limited to, databases, tables, records, arrays and list.

The reflected property descriptor 320 is adapted to store values of properties associated with the instance of the component that can be reported to the developer by the type descriptor. The reflected event descriptor 330 is adapted to store descriptions of events related to the instance of the component and to have the event descriptors reported to the developer. The attribute collection 340 is adapted to store additional descriptive elements that modify types and members and to have the additional descriptive elements reported to the developer.

The component entry 310 facilitates communication between instances of components and the developer at design time. For example, a component having two properties can report via the type descriptor the number of properties and the properties' current values to the developer. However, as discussed infra, the number of properties and/or the values of the properties of an instance of a component can be altered at design time. The system of the present invention thus can adaptively report the current number of properties and the current values of those properties in response to a request from a developer (e.g., a "refresh" operation) increasing application development efficiency and providing a richer design time environment.

Figure 4:
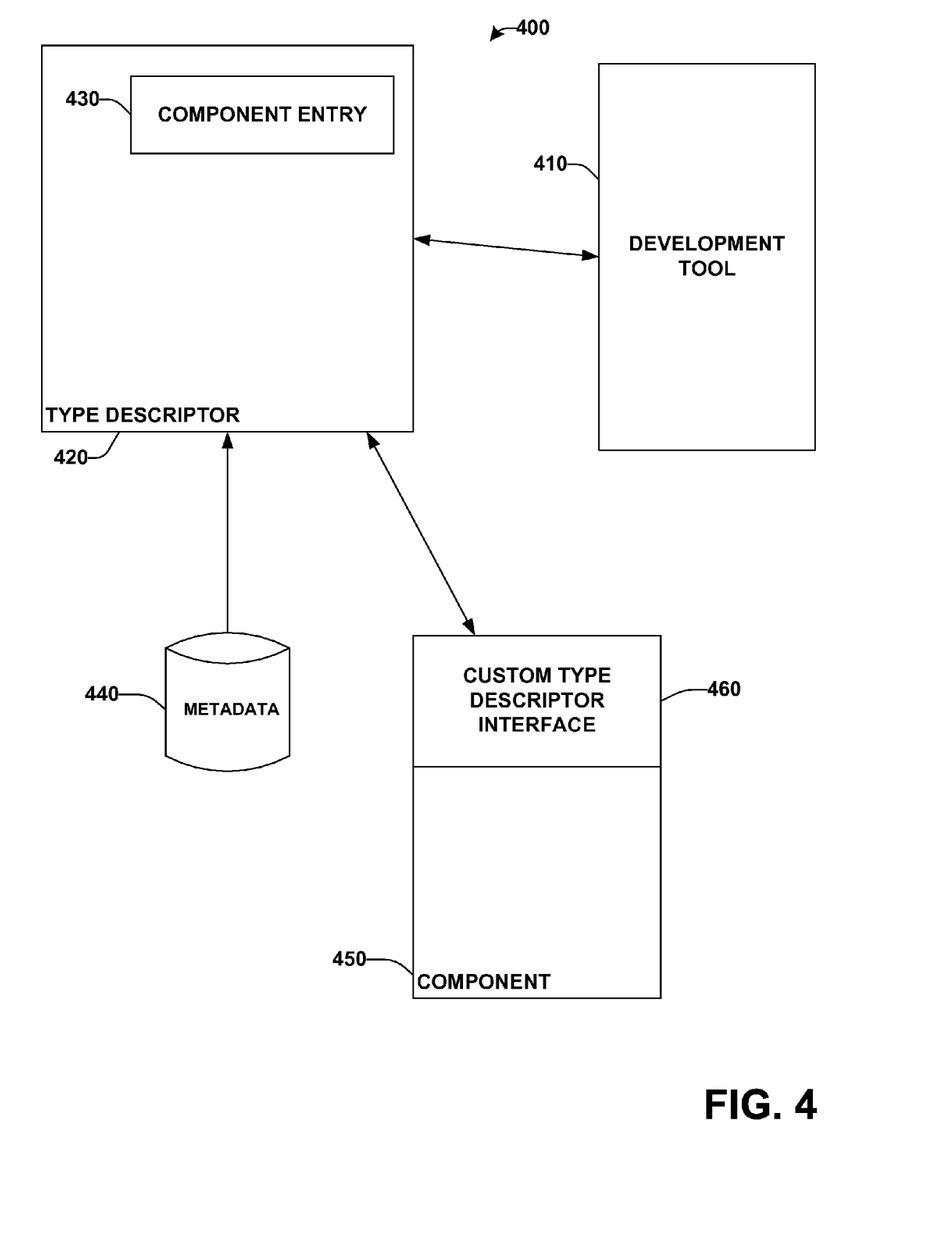
FIG. 4 is a schematic block diagram illustrating a system for implementing a design time component model discovery service having a component adapted to provide a custom type interface.

Referring to FIG. 4, a system 400 for implementing a design time component model discovery service having a component 450 adapted to provide a custom type descriptor interface 460 is illustrated. If the custom type descriptor interface 460 is not implemented, pure metadata 440 regarding the instance of the component 450 is provided to a type descriptor 420 that is stored and reported to the development tool 410. However, if the custom type descriptor interface 460 is implemented, the custom type descriptor interface 460 is responsible for providing information, which can be pure metadata or manipulated information, to the type descriptor 420.

For components that implement the custom type descriptor interface 460, type descriptor, instead of examining metadata 440 concerning the instance of the component, requests the custom type descriptor interface 460 to provide information about the instance of the component 450 through the component's custom type descriptor interface 460. The custom type descriptor interface 460 is adapted to monitor information concerning the instance of the component (e.g., attributes) and to manipulate the information before reporting the information to the type descriptor 460. Accordingly, the component 450 can dynamically alter information (e.g., attributes such as properties and events) associated with the instance of the component. The type descriptor 420 can store the information in a component entry 430 for the instance of the component 450 and report the information to development tool 410.

By dynamically reporting information (e.g., attributes such as properties and events) concerning the instance of the component, the component can define its information at design time and/or run time as opposed to compile time. Thus, a component can adaptively modify or revise information about itself depending on whether it is running at design time or run time. Furthermore, a component can adaptively modify or revise information about itself depending upon the environment in which it will be run (e.g., access to a WAN, LAN or the Internet).

Figure 5:
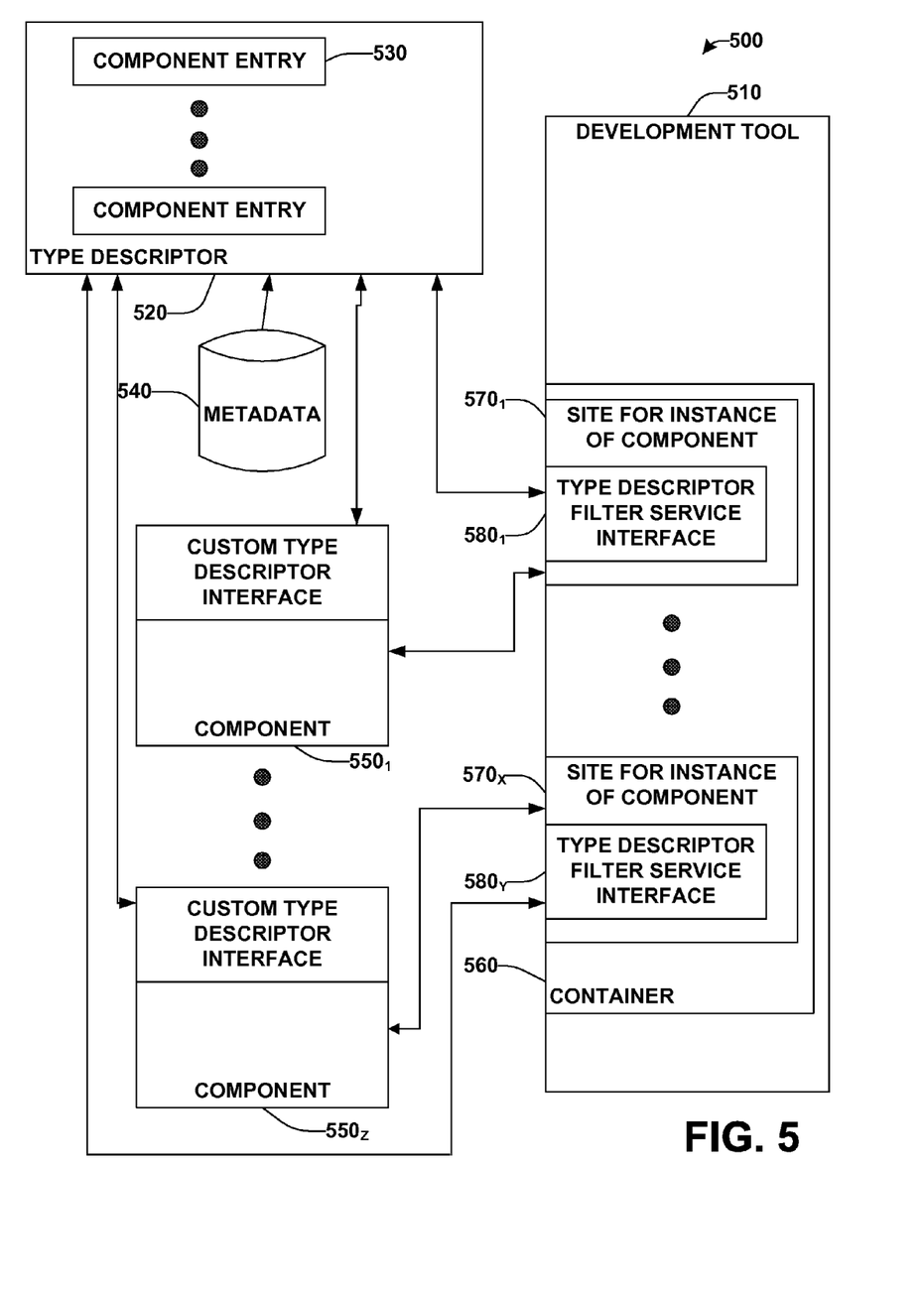
FIG. 5 is a schematic block diagram illustrating a system for implementing a design time component model discovery service having a container adapted to provide a type descriptor filter service interfaces.

FIG. 5 illustrates a system 500 for implementing a design time component model discovery service having a container 570 having a site $570_1$ through an Xth site $570_X$, X being an integer. The sites $570_1$ through $570_X$ can be referred to collectively as the sites 570. The sites 570 are adapted to provide a type descriptor filter service interface $580_1$ through an Yth type descriptor filter service interface $580_Y$, Y being an integer. The type descriptor filter service interfaces $580_1$ through $580_Y$ can be referred to collectively as the type descriptor filter service interface 580.

The existence of the type descriptor filter service interface 580 can be transparent to the developer. The type descriptor filter service interface 580 can be implemented on sites 570 of a container 560 (e.g., window) that owns an instance of a component, such as component $550_1$. The system can include instances of components $550_1$ through a Zth component $550_Z$, Z being an integer. The components $550_1$ through $550_Z$ can be referred to collectively as component 550.

At design time, a developer requests the development tool 510 to report information (e.g., attributes such as properties and events) concerning an instance of a component 550. The development tool 510 requests the type descriptor 520 to report information associated with the instance of the component 550. Type descriptor determines whether the instance of the component has a site 570 (e.g., is owned by a container 560). If the instance of the component 550 has a site 570, the type descriptor 520 determines whether the site 570 offers the type descriptor filter service interface 580 for the instance of the component 550.

If the type descriptor filter service interface 580 is provided, the type descriptor 520 obtains information associated with the instance of the component 550. The information (e.g., attributes such as properties and events) can be pure metadata 540 or information manipulated through a custom type descriptor interface 560 on the instance of the component 550. The type descriptor 520 then provides the information to the type descriptor filter service 580 that can manipulate the information by: (1) adding additional attributes (e.g., properties and events); (2) removing attributes (e.g., properties and events); and/or (3) replacing attributes (e.g., properties and events) with different values in order to simulate the run time environment.

After the type descriptor filter service interface 580 performs any manipulation, the information is provided to the type descriptor 520. The type descriptor 520 can store the information concerning the instance of the component 550 in a component entry 530 and report the information to the development tool 510 that reports the information to the developer. Thus, the filtering process is transparent to the developer since the developer views the manipulated information concerning the instance of the component. Furthermore, by the design time functionality of the component can be implemented by a separate object (e.g., type descriptor filter service) independent of the component. This can result in the component can be significantly smaller in size resulting in memory savings at run time.

Further, the container 560 is adapted to allow a component to add, modify and/or delete attributes of another component. For example, a component of a class "control" that has two properties "visible" and "text" would generally have the number of properties (e.g., two) and the values of the two properties included in the reflected property descriptor of the component entry for the instance of the component. However, at design time, another component, for example "tooltip" can add an additional extender property (e.g., property "tooltip") onto the instance of the component "control" to simulate a run time environment. In response to a query from the developer for the properties of the instance of the component "control", the type descriptor would obtain the number of properties—two—and the values of the properties from the instance of the component "control". The type descriptor would provide these two properties to the container owning the instance of the component "control" that would determine whether any other components (e.g., component "tooltip") contained by it desires to expose additional properties on the instance of the component "control". Desiring to add the extender property "tooltip" to the properties of the instance of the component "control", the instance of the component "tooltip" would add the extender property "tooltip" onto the properties associated with the instance of the component "control". The properties of "control"—"visible", "text" and "tooltip"—would then be provided to the type descriptor filter service that would perform any further manipulation of the properties. The type descriptor filter service interface would provide the manipulated properties associated with "control" to the type descriptor. For example, if the type descriptor filter service did not alter the properties of "control", the number of properties—three—and the values of the properties would be reported to and stored by the type descriptor that would then report the properties to the developer.

Thus, when queried by the developer for the properties associated with "control", the type descriptor would identify the number of properties (three) and the then current values of the three properties. The addition, deletion and/or modification of the properties by the component, other components and the custom type descriptor filter interface would thus be transparent to the developer.

Figure 6:
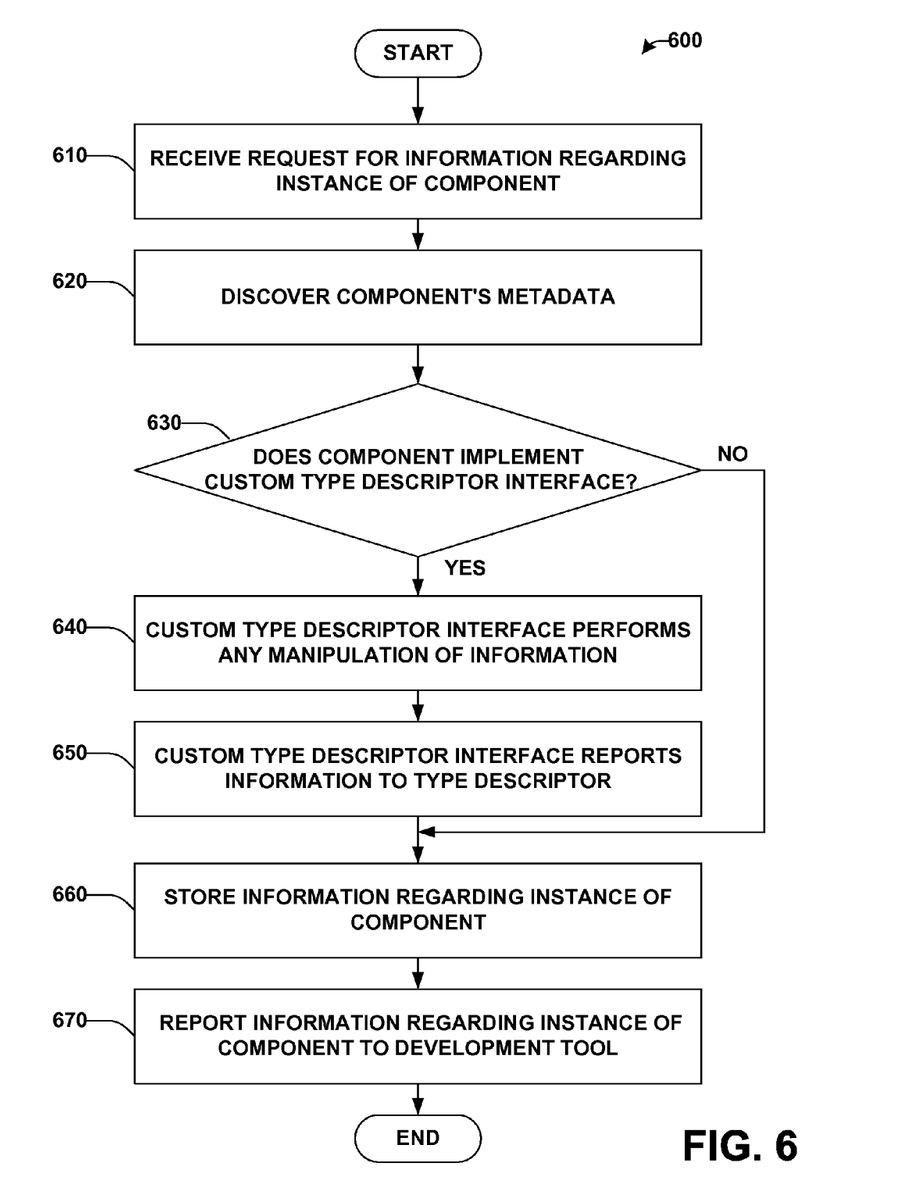
FIG. 6 is a flow diagram illustrating an exemplary method for discovering design time information concerning an instance of a component.

Referring now to FIG. 6, an exemplary method 600 for discovering design time information concerning an instance of a component is illustrated. It will be appreciated that the method 600 may be implemented in the systems and tools described supra, and further that the method may be practiced in other systems not illustrated. While for purposes of simplicity of explanation, the methodology of FIG. 6 is shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention. Beginning at 610, a request is received by a type descriptor for information (e.g., attributes such as properties and events) regarding an instance of a component. At 620, the type descriptor discovers the instance of the component's metadata. At 630, a determination is made concerning whether the component implements a custom type descriptor interface. If the determination at 630 is NO, then at 660 the component's metadata is stored in the type descriptor. If the determination at 630 is YES, then at 640, the custom type descriptor interface performs any manipulation of the information (e.g., metadata). At 650 the custom type descriptor interface reports the information to the type descriptor. At 660, the type descriptor stores the information regarding the instance of the component. At 670, the type descriptor reports the information (e.g., attributes such as properties and events) to the development tool.

Figure 7A:
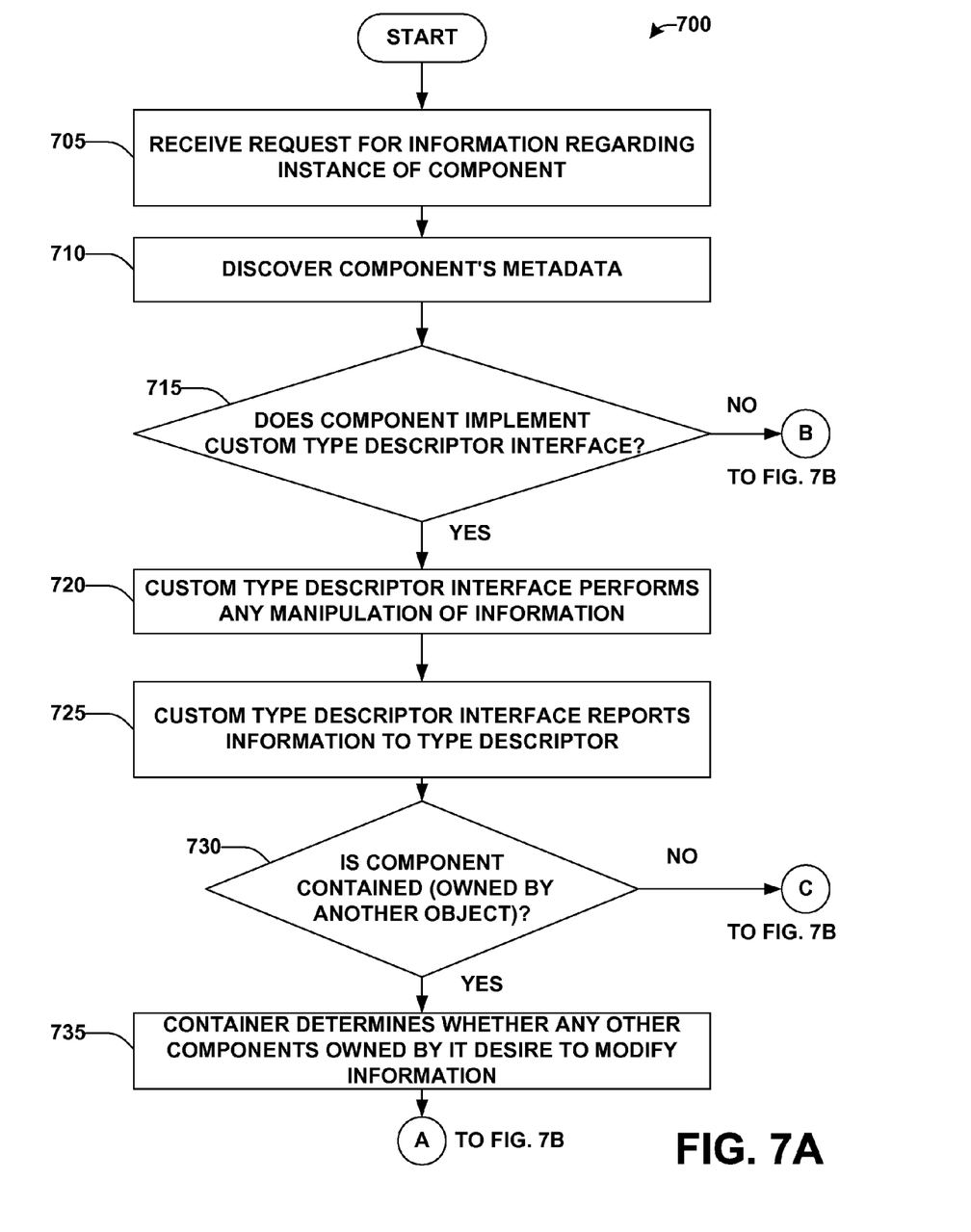
FIG. 7A is a flow diagram illustrating an exemplary method for discovering design time information of an instance of a component having a custom type interface and a development tool having a type descriptor filter service interface.
Figure 7B:
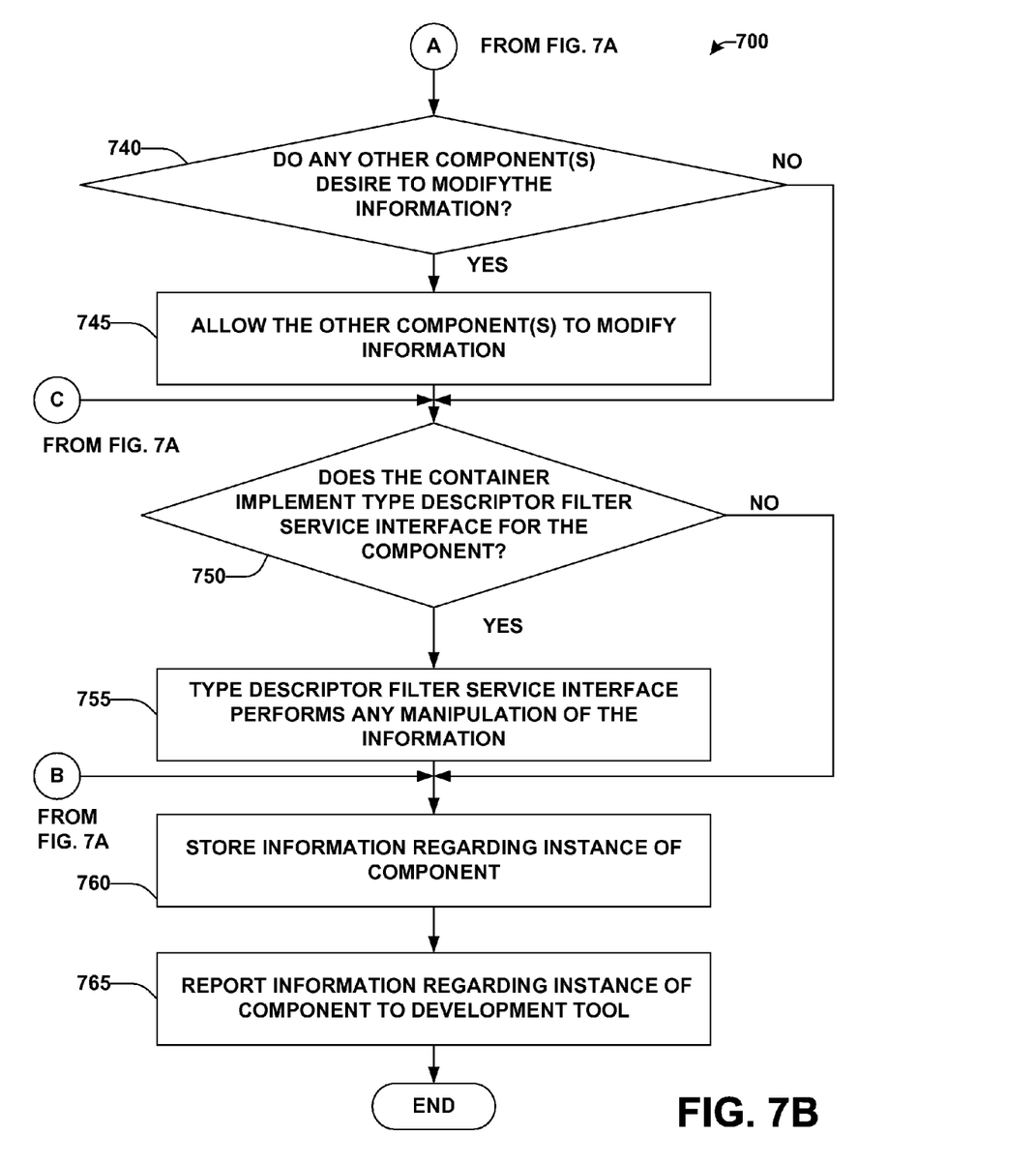
FIG. 7B is a flow diagram further illustrating the method of FIG. 7A.

FIGS. 7A and 7B illustrate an exemplary method for discovering design time information of an instance of a component having a custom type interface and a development tool having a type descriptor filter service interface. It will be appreciated that the method 600 may be implemented in the systems and tools described supra, and further that the method may be practiced in other systems not illustrated. While for purposes of simplicity of explanation, the methodology of FIGS. 7A and 7B is shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention. Beginning at 705, a request is received by a type descriptor for information (e.g., attributes such as properties and events) regarding an instance of a component. At 710, the type descriptor discovers the instance of the component's metadata. At 715, a determination is made concerning whether the component implements a custom type descriptor interface. If the determination at 715 is NO, then at 760 the component's metadata is stored in the type descriptor. If the determination at 715 is YES, then at 720, the custom type descriptor interface performs any manipulation of the information (e.g., metadata). At 725, the custom type descriptor interface reports the information to the type descriptor.

Continuing, at 730, a determination is made concerning whether the component is contained (e.g., owned by another object such as a window). If the determination at 730 is NO, then at 750 processing is continued. If the determination at 730 is YES, then the container determines whether any other component(s) contained (owned) by the container desire to modify the information. At 740 a determination is made concerning whether any other component(s) desire to modify the information. If the determination is NO, processing continues at 750. If the determination is YES, the other component(s) are allowed to modify the information.

Further continuing, at 750, a determination is made whether the container implements a type descriptor filter service for the component. If the determination is NO, processing continues at 760. If the determination is YES, at 755 the type descriptor filter service interface performs any manipulation of the information. At 760, the type descriptor stores the information regarding the instance of the component. At 765, the type descriptor reports the information (e.g., attributes such as properties and events) to the development tool.

Figure 8:
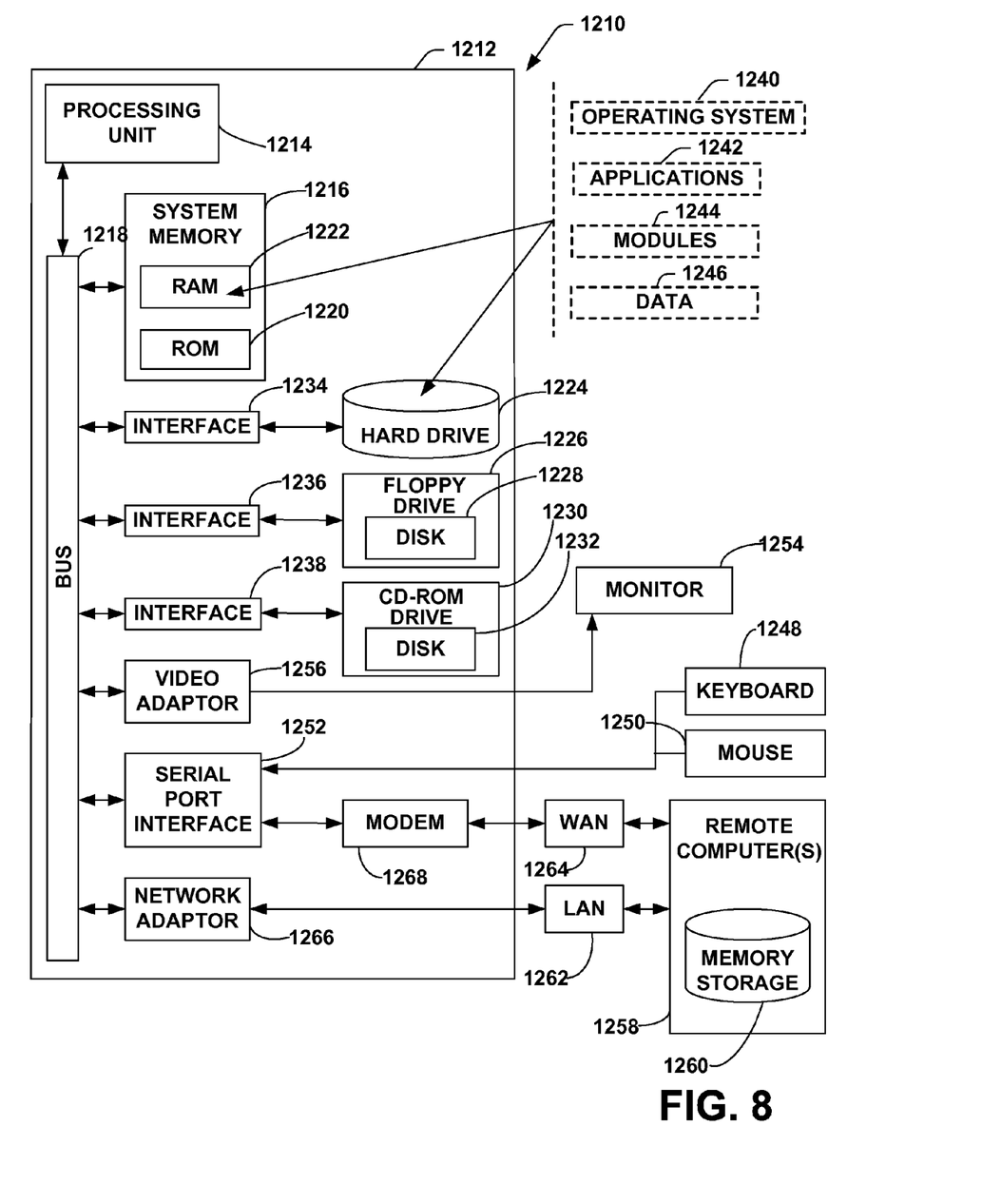
FIG. 8 is a schematic diagram illustrating a suitable operating environment in which various aspects of the present invention may be implemented.

FIG. 8 is a schematic block diagram of an exemplary operating environment for a system configured in accordance with the present invention. In order to provide additional context for various aspects of the present invention, FIG. 8 and the following discussion are intended to provide a brief, general description of a suitable computing environment 1210 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 12, an exemplary environment 1210 for implementing various aspects of the invention includes a computer 1212, the computer 1212 including a processing unit 1214, a system memory 1216 and a system bus 1218. The system bus 1218 couples system components including, but not limited to, the system memory 1216 to the processing unit 1214. The processing unit 1214 may be any of various commercially available processors. Dual microprocessors and other multi-processor architectures also can be employed as the processing unit 1214.

The system bus 1218 can be any of several types of bus structure including a memory bus or memory controller, a peripheral bus and a local bus using any of a variety of commercially available bus architectures. The system memory 1222 includes read only memory (ROM) 1220 and random access memory (RAM) 1222. A basic input/output system (BIOS), containing the basic routines that help to transfer information between elements within the computer 1212, such as during start-up, is stored in ROM 1220.

The computer 1212 further includes a hard disk drive 1224, a magnetic disk drive 1226, (e.g., to read from or write to a removable disk 1228) and an optical disk drive 1230, (e.g., for reading a CD-ROM disk 1232 or to read from or write to other optical media). The hard disk drive 1224, magnetic disk drive 1226 and optical disk drive 1230 can be connected to the system bus 1218 by a hard disk drive interface 1234, a magnetic disk drive interface 1236 and an optical drive interface 1238, respectively. The drives and their associated computer-readable media provide nonvolatile storage of data, data structures, computer-executable instructions, etc. for the computer 1212, including for the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 1222, including an operating system 1240, one or more application programs 1242, other program modules 1244 and program data 1246. It is to be appreciated that the present invention can be implemented with various commercially available operating systems or combinations of operating systems.

A user can enter commands and information into the computer 1212 through a keyboard 1248 and a pointing device, such as a mouse 1250. Other input devices (not shown) may include a microphone, an IR remote control, a joystick, a game pad, a satellite dish, cameras, in the sense of gesture interpreted through cameras and machine-vision software, a scanner, or the like. These and other input devices are often connected to the processing unit 1214 through a serial port interface 1252 that is coupled to the system bus 1218, but may be connected by other interfaces, such as a parallel port, a game port, a universal serial bus ("USB"), an IR interface, etc. A monitor 1254 or other type of display device is also connected to the system bus 1218 via an interface, such as a video adapter 1256. In addition to the monitor, a computer typically includes other peripheral output devices (not shown), such as speakers, printers etc.

The computer 1212 may operate in a networked environment using logical connections to one or more remote computers, such as a remote computer(s) 1258. The remote computer(s) 1258 may be a workstation, a server computer, a router, a personal computer, microprocessor based entertainment appliance, a peer device or other common network node, and typically includes many or all of the elements described relative to the computer 1212, although, for purposes of brevity, only a memory storage device 1260 is illustrated. The logical connections depicted include a local area network (LAN) 1262 and a wide area network (WAN) 1264. Such networking environments are commonplace in offices, enterprise-wide computer networks, intranets and the Internet.

When used in a LAN networking environment, the computer 1212 is connected to the local network 1262 through a network interface or adapter 1266. When used in a WAN networking environment, the computer 1212 typically includes a modem 1268, or is connected to a communications server on the LAN, or has other means for establishing communications over the WAN 1264, such as the Internet. The modem 1268, which may be internal or external, is connected to the system bus 1218 via the serial port interface 1252. In a networked environment, program modules depicted relative to the computer 1212, or portions thereof, may be stored in the remote memory storage device 1260. It will be appreciated that the network connections shown are exemplary and other means of establishing a communications link between the computers may be used.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising", as comprising is interpreted as a transitional word in a claim.

What is claimed is:

1. In a computing environment comprising a processor operatively coupled to a memory, a computer-implemented method for discovering design time information concerning an instance of a component, the method comprising:
    an act of a type descriptor receiving from a development tool a request for information regarding an instance of a component;
    an act of the type descriptor discovering compile time information regarding the instance of the component from compiled metadata, wherein the complied metadata comprises metadata that was compiled into the component;
    an act of the type descriptor determining that the component implements a custom type descriptor interface, wherein the custom type descriptor interface is adapted to monitor the instance of the component and to manipulate the compile time information before reporting to the type descriptor manipulated information regarding the instance of the component, wherein the manipulated information includes changes to the compile time information as the compile time information is dynamically changed by the instance of the component during design time;
    an act of the custom type descriptor interface manipulating the compile time information to generate the manipulated information, wherein the manipulated information includes at least some changes to the compile time information that were dynamically changed by the instance of the component during design time, and wherein the manipulated information is different from the compile time information;
    an act of the custom type descriptor interface reporting to the type descriptor the manipulated information regarding the instance of the component;
    an act of the type descriptor storing the manipulated information in at least one component entry associated with the instance of the component;
    an act of the type descriptor reporting the information regarding the instance of the component to the development tool by reporting at least some of the manipulated information regarding the instance of the component.

2. The method of claim 1, wherein the information regarding the instance of the component comprises attributes of the instance of the component, the attributes including at least one of properties or events.

3. The method of claim 1, wherein the at least one component entry includes:
    one or more reflected property descriptors, wherein each of the one or more reflected property descriptors stores a description of a property associated with the instance of the component, and wherein the one or more reflected property descriptors are used by the type descriptor to report descriptions of properties associated with the instance of the component to the development tool;
    one or more reflected event descriptors, wherein each of the one or more reflected event descriptors stores a description of an event associated with the instance of the component, and wherein the one or more reflected event descriptors are used by the type descriptor to report descriptions of events associated with the instance of the component to the development tool; and
    an attribute collection, wherein the attribute collection stores additional descriptive elements that modify types and members associated with the instance of the component, and wherein the attribute collection is used by the type descriptor to report the additional descriptive elements associated with the instance of the component to the development tool.

4. The method of claim 3, wherein the property is selected from a name, attributes, component class that the property is associated with, or a type of the property.

5. The method of claim 3, wherein the property the event is selected from a name, attributes, a component that the event is bound to, an event delegate, a type of the delegate, and whether the delegate is multicast.

6. The method of claim 1, wherein the type descriptor refers to the at least one component entry associated with the instance of the component to report the information to the development tool.

7. The method of claim 1, further comprising:
    an act of determining that the instance of the component is owned by a container;
    an act of the container determining that at least one other component owned by the container desires to modify the manipulated information regarding the instance of the component; and
    an act of allowing the at least one other component to modify the manipulated information regarding the instance of the component.

8. The method of claim 1, further comprising:
    an act of the type descriptor determining that the container implements a type descriptor filter service for the component, wherein the type descriptor filter service; and an act of the type descriptor providing the manipulated information to the type descriptor filter service for the component;

an act of the type descriptor filter service modifying the manipulated information regarding the instance of the component; and an act of the type descriptor filter service reporting to the type descriptor the manipulated information regarding the instance of the component.

9. The method of claim 8, wherein modifying the manipulated information comprises at least one of adding attributes, removing attributes, and replacing attributes.

10. The method of claim 1, wherein the at least one component entry is stored in at least one of databases, tables, records, arrays, or lists.

11. One or more storage media having stored thereon computer-executable instructions that when executed by one or more processors of a computer system, cause the computer system to perform the method of claim 1.

12. A computer-implemented system comprising a processor and one or more storage media operatively coupled to the processor, the one or more storage media having stored thereon computer executable instructions that, when executed by the processor, implement the method of claim 1.

* * * * *